UNITED STATES PATENT OFFICE 2,174,492

PREPARATION OF ALKANE SULPHONYL CHLORIDES

Cortes F. Reed, Anoka, Minn., assignor to Charles L. Horn, Minneapolis, Minn.

No Drawing. Application December 20, 1938, Serial No. 246,900

6 Claims. (Cl. 260—543)

This invention relates to the vapor phase preparation of organic compounds from alkanes which are normally gaseous. More particularly it relates to the preparation of sulphonyl chlorides from the normally gaseous alkanes. Still more particularly it relates to processes of reacting the normally gaseous alkanes with a gaseous mixture of sulphur dioxide and chlorine and to the recovery of valuable components and mixtures from the reaction products. By "normally gaseous alkanes" is meant aliphatic hydrocarbons of the formula $C_nH_{2n+2}$, wherein $n$ is 1 to 5 inclusive.

This invention has as an object the preparation of sulphonyl chlorides from normally gaseous alkanes by a single reaction step. A further object is the preparation of such sulphonyl chlorides from readily available reactants. A still further object is the preparation of the aforesaid compounds and compositions in an improved manner involving a single reaction step and cheap initial materials. A still further object is the preparation of lower alkane sulphonyl chlorides which involves the use of simple, economical apparatus. Still other objects will appear hereinafter.

The above and other objects are accomplished by the following invention which comprises reacting a normally gaseous alkane with a mixture of gaseous sulphur dioxide and chlorine. The alkane is preferably introduced in the gaseous state into a suitable reaction chamber simultaneously with a mixture of sulphur dioxide and chlorine, though the sulphur dioxide-chlorine mixture may be passed into a solution of the alkane in a suitable solvent. The reaction products are condensed in suitable traps and the desired sulphonyl chloride or chlorides recovered from the condensate.

The invention will be further illustrated but is not intended to be limited by the following examples in which the parts stated are parts by weight.

*Example I*

Gaseous sulphur dioxide and chlorine are mixed in approximately equal amounts and conducted along with gaseous ethane into an acid resistant reaction vessel provided with a reflux condenser cooled with ice water. The exit gases are passed through a larger vessel, likewise provided with an ice cooled condenser, and then through a trap cooled with carbon dioxide snow. The rate of introducing the various gases is so adjusted that, over a period of 5 hours and 20 minutes, about 83 parts of sulphur dioxide, 68 parts of chlorine, and 27 parts of ethane are passed into the system. The ethane sulphonyl chloride which is formed collects mostly in the carbon dioxide trap, along with sulphuryl chloride. It is separated by fractionation and identified by reaction with liquid ammonia to form ethane sulphonamide of M. P. 58–59° C. (C. 1913, II, 1960).

*Example II*

With an apparatus and in a manner similar to Example I, 248 parts of sulphur dioxide, 171 parts of chlorine and 66 parts of ethane are introduced in the vapor phase into a large reaction vessel over a period of 14 hours. The ethane sulphonyl chloride collects largely in the second vessel, and is purified by fractionation in vacuo, that fraction boiling at 71° C./22 mm. being collected.

*Example III*

Gaseous propane is reacted with sulphur dioxide and chlorine in the vapor phase in a manner similar to that described in Example I and with an apparatus similar in principle to that of Example I. The reaction is continued for 18 hours, during which time the introduction of the gases is so regulated that 154 parts of propane, 272 parts of sulphur dioxide, and 176 parts of chlorine are used. Fractional distillation of the contents of both vessels yields a product boiling at 77–83° C./22 mm. This is a mixture of n- and iso-propyl sulphonyl chlorides, whose boiling points are 77–78° C./13 mm. and 79° C./18 mm. respectively.

*Example IV*

Five hundred (500) parts of carbon tetrachloride is placed in a large acid resistant vessel fitted with a gas inlet, gas distributing stirrer, and reflux condenser. Propane, chlorine, and sulphur dioxide are mixed and passed into the carbon tetrachloride near the bottom of the vessel. A reaction takes place, the temperature rising from 22.5° C. to a maximum of 28° C. The reaction is continued for 8 hours, during which time the introduction of the gases is so regulated that about 182 parts of propane, 465 parts of sulphur dioxide, and 397 parts of chlorine are used. At the end of 8 hours, the carbon tetrachloride is distilled off, leaving a residue of propane sulphonyl chlorides, boiling at 64–68° C./10 mm.

In the modification of the process illustrated by Example IV, the solvent should be a chlorinated (and preferably completely chlorinated) saturated aliphatic hydrocarbon. Carbon tetrachloride and hexachloroethane are typical suitable solvents.

*Example V*

Ethane, sulphur dioxide and chlorine were simultaneously introduced into a reaction flask at the rate of 86 cubic centimeters of ethane, 112 cubic centimeters of sulphur dioxide, and 96 cubic centimeters of chlorine per minute. The reaction flask was not heated but was illuminated by means of a 150 watt light bulb at a distance of one and one half feet. The products of reaction were conducted into a 5 gallon bottle packed in melting ice. After six hours 32.6 cc. (47.9 grams) of liquids having a specific gravity of 1.46 were collected. Twenty-six per cent was ethane chlorides, and the balance of forty-three percent was composed of sulphur and chlorine containing hydrocarbons. These latter were hydrolyzed with sodium carbonate and yielded the sodium salt of ethyl sulphonic acid.

*Example VI*

Commercial "bottled" propane gas from Mid-Continent oil fields, which consists of from 90 to 95 per cent propane together with ethane, methane and butane as impurities, was introduced into a two liter reaction flask along with sulphur dioxide and chlorine at the rate of 93 cubic centimeters of "propane", 150 cubic centimeters of sulphur dioxide, and 78 cubic centimeters of chlorine, per minute. The reaction was begun at room temperature, but the temperature rapidly rose to 65° C. The reaction was carried in the presence of light from a 150 watt lamp, placed adjacent the reaction vessel. The products of reaction were collected at the rate of 10 cc. (14.65 grams) per hour by means of a reflux condenser during the five hour reaction period.

The products of reaction comprised a liquid having a specific gravity of 1.465 at 22° C. and was composed of sulphur (as sulphur dioxide) 19.64%, chlorine 45.07%, and organic material 35.29%. Eighteen per cent of the resultant product was sulphuryl chloride, having a boiling point of 69° to 70° C. The sulphuryl chloride was soluble in water, with the evolution of heat, and was separated. The balance was neutralized and boiled with sodium carbonate and consisted of dichlorpropane together with small amounts of trichlor propane. Propyl sulphonic acid was obtained by boiling the neutral aqueous solution to dryness.

In place of the specific hydrocarbons of the preceding examples there may be substituted any other normally gaseous alkane, i. e., methane, butane, isobutane, n-pentane, 2,2-dimethylpropane, or 2-methylbutane, and similar results will be obtained. It will be noted that these hydrocarbons have from one to five carbons inclusive and are all gaseous at 40° C. and 760 mm. pressure.

Various types of apparatus may be used. Any of the non-corrosive materials used for chemical apparatus may be employed. Means for distributing the gases may include porous diaphragms, perforated coils or similar devices, which may be used alone or in conjunction with suitable conventional agitators. Instead of a closed vessel provided with a reflux condenser, a long narrow tube may be used. The tube is preferably a vapor phase reaction zone, but it may be partially filled with a solution of the alkane in a suitable solvent, the chlorine-sulphur dioxide mixture being bubbled through it, or it may be partially filled with the solvent, and a mixture of all these reactants bubbled through. Such reaction tubes can be filled with various inert materials that provide an extensive surface and thus promote reaction between a liquid and a gas, e. g., Raschig rings, broken glass, glass beads, glass rings, platinum gauze, and chains or rings of any inert material. Apparatus and conditions may be so chosen so that the process will be a batch or continuous one, unreacted ingredients being recovered, purified, and recycled, if desired. Recycling, with introduction of additional sulphur dioxide and chlorine as needed, is particularly significant for an economical process and satisfactory over all yield since the yield per pass is usually low.

The temperature may vary from that sufficient to maintain the chlorine and sulphur dioxide in the gaseous state at the pressure used, usually at least −10° C., up to a point just under the thermal decomposition temperature of the products obtained. At atmospheric pressure, temperatures of from 20° C. to 150° C. represent a practical range, and exceptionally good results are obtained between 30° C. and 80° C.

The reaction can be considerably accelerated by exposing the reaction zone to actinic light, which may be ordinary indoor daylight, bright sunlight, or artificial light of various wave lengths—ultraviolet, infrared, or the light of ordinary clear or frosted incandescent lamps, carbon arcs, including metal cored and metal salt cored carbon arcs and rare gas lamps.

The pressure may vary from atmospheric up to that incidentally developed in closed systems, whenever the latter are used. The pressure, however, should not be so high as to cause liquefaction of the sulphur dioxide and chlorine at reaction temperature. The proportions of sulphur dioxide to chlorine may vary from about 1 to 20 mols of the former to one of the latter. The practical range is about 2 to 6 mols of sulphur dioxide per mol of chlorine, and the preferred range is about 2.5 to 3.5 mols of sulphur dioxide per mol of chlorine.

In general, reaction conditions are so chosen that at least the sulphur dioxide and chlorine, and preferably the alkane as well, are in the gaseous state. The present process involves principally a vapor phase reaction with normally gaseous alkanes and differs in these respects from known processes.

The greatest advantages of the present process over known methods for making sulphonyl chlorides of normally gaseous alkanes are simplicity and economy. Known methods include chlorination of S-alkylthioureas (J. A. C. S. 59, 1839) and reaction of sulphonates with phosphorus pentachloride or sulphonyl chloride. These reactants are expensive and difficult to prepare, the sulphonates being made, for example, by oxidation of mercaptans, sulphides, or alkyl thiocyanates, or from alkyl iodides and sodium bisulphite. The present process, on the other hand, utilizes readily available raw materials and requires only a single reaction step. The present process is distinctly set apart from that of United States Patent 2,046,090 in that, particularly when methane and ethane are employed, known indentifiable products are obtained instead of the complex inseparable mixtures that result from higher aliphatic hydrocarbons. Another difference is that the present process is a vapor phase one.

As many apparently widely different embodiments of this invention may be made without departing from the spirit and scope thereof, it is to be understood that I do not limit myself to the specific embodiments herein except as defined by the appended claims.

I claim:

1. The process which comprises reacting a normally gaseous alkane with a gaseous mixture of sulphur dioxide and chlorine.

2. The process which comprises reacting a normally gaseous alkane in the vapor phase with a gaseous mixture of sulphur dioxide and chlorine.

3. The process which comprises reacting a normally gaseous alkane in the vapor phase with a gaseous mixture of sulphur dioxide and chlorine, and recovering a hydrocarbon sulphonylchloride.

4. The process which comprises reacting a normally gaseous alkane in the vapor phase with a gaseous mixture of sulphur dioxide and chlorine at a temperature of from −10° C. to 150° C., and recovering a hydrocarbon sulphonyl chloride.

5. The process which comprises reacting a normally gaseous alkane in the vapor phase with a gaseous mixture of sulphur dioxide and chlorine at a temperature between 30° C. and 80° C. and in the presence of actinic light, and recovering a hydrocarbon sulphonyl chloride.

6. The process which comprises reacting a normally gaseous alkane in the vapor phase with a gaseous mixture of sulphur dioxide and chlorine in which the former predominates, at a temperature between 30° C. and 80° C. and in the presence of actinic light, and recovering a hydrocarbon sulphonyl chloride.

CORTES F. REED.